(12) United States Patent
Wurman et al.

(10) Patent No.: US 12,083,429 B2
(45) Date of Patent: Sep. 10, 2024

(54) ARTIFICIAL INTELLIGENCE FOR DRIVING LINES IN RACING GAMES

(71) Applicants: Sony Group Corporation, Tokyo (JP); Sony Corporation of America, New York, NY (US)

(72) Inventors: Peter Wurman, Acton, MA (US); Kaushik Subramanian, Metzingen (DE); Florian Fuchs, Zürich (CH); Takuma Seno, Tokyo (JP); Kenta Kawamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 275 days.

(21) Appl. No.: 17/650,300

(22) Filed: Feb. 8, 2022

(65) Prior Publication Data

US 2023/0249074 A1    Aug. 10, 2023

(51) Int. Cl.
*A63F 13/5375*    (2014.01)
*A63F 13/49*    (2014.01)
(Continued)

(52) U.S. Cl.
CPC .......... *A63F 13/5375* (2014.09); *A63F 13/49* (2014.09); *A63F 13/573* (2014.09);
(Continued)

(58) Field of Classification Search
CPC ................ A63F 13/803; A63F 13/5375; A63F 2300/807; G06N 3/02
See application file for complete search history.

(56) References Cited

U.S. PATENT DOCUMENTS 6,200,138 B1 *    3/2001    Ando .................... A63F 13/803
463/31
6,652,376 B1 *    11/2003    Yoshida .................. A63F 13/65
463/6
(Continued)

FOREIGN PATENT DOCUMENTS

| CN | 112749618 A | * | 5/2021 | ............. G06F 3/013 |
| EP | 1029569 A2 | * | 8/2000 | ............. A63F 13/10 |
| WO | 2020092271 A1 | | 5/2020 | |

OTHER PUBLICATIONS

"Perfect lap times with deep learning AI," by Nana Krustofski, published Oct. 16, 2020. Source:https://www.overtake.gg/articles-columns/feature/perfect-lap-times-with-deep-learning-ai/ (Year: 2020).*

(Continued)

*Primary Examiner* — Steven J Hylinski
(74) *Attorney, Agent, or Firm* — INNOVATION CAPITAL LAW GROUP, LLP; Vic Lin

(57) ABSTRACT

Dynamic driving aides, such as driving lines, turn indicators, braking indicators and acceleration indicators, for example, can be provided for players participating in a racing game. Typically, driving lines are provided for each class of cars. However, even within a class of cars, each car differs enough that the ideal driving lines and breaking points can vary. Therefore, with an agent trained via reinforcement learning, an ideal lines and other driving aides can be established for every individual car. These guides can even be varied to account for variations in the weather or other track conditions.

15 Claims, 2 Drawing Sheets

(51) Int. Cl.
    *A63F 13/573*     (2014.01)
    *A63F 13/58*     (2014.01)
    *A63F 13/803*     (2014.01)
    *G06N 3/02*     (2006.01)

(52) U.S. Cl.
    CPC ............ *A63F 13/58* (2014.09); *A63F 13/803* (2014.09); *G06N 3/02* (2013.01); *A63F 2300/8017* (2013.01)

(56) References Cited

U.S. PATENT DOCUMENTS

| | | | | |
|---|---|---|---|---|
| 7,744,451 | B2 * | 6/2010 | Tipping | A63F 13/45 463/6 |
| 7,785,178 | B2 * | 8/2010 | Tipping | A63F 13/10 463/6 |
| 7,953,521 | B2 * | 5/2011 | Tipping | G09B 9/04 700/47 |
| 10,406,438 | B2 * | 9/2019 | Catlin | A63F 13/35 |
| 10,940,393 | B2 | 3/2021 | Somers et al. | |
| 11,684,856 | B2 * | 6/2023 | Weng | A63F 13/22 463/6 |
| 2003/0130031 | A1 | 7/2003 | Yoshida | |
| 2004/0266506 | A1 * | 12/2004 | Herbrich | A63F 13/30 463/6 |
| 2014/0089862 | A1 | 3/2014 | Jones | |
| 2020/0238178 | A1 | 7/2020 | Lin et al. | |
| 2021/0260482 | A1 | 8/2021 | Nakahashi | |

OTHER PUBLICATIONS

"How to make AI learn the racing line for a track," by Marco Versele, published Jun. 14, 2014. Source:https://www.racedepartment.com/threads/how-to-make-ai-learn-the-racing-line-for-a-track.88801/ (Year: 2014).*

"Understanding the driving line, Forza Horizon 5," published Nov. 10, 2021. Source: https://gamefaqs.gamespot.com/boards/323429-forza-horizon-5/79752935 (Year: 2021).*

"A mod for racing line," published May 15, 2019. Source: https://forum.studio-397.com/index.php?threads/a-mod-for-racing-line.63151/ (Year: 2019).*

"Forza Horizon 5 Steam," accessed Jan. 12, 2024. Source: https://store.steampowered.com/app/1551360/Forza_Horizon_5/ (Year: 2024).*

"Garmin Catalyst is an AI racing coach that that literally shows you how to be faster," by Antuan Goodwin, published Sep. 3, 2020. Source:https://www.cnet.com/roadshow/news/garmin-catalyst-ai-performance-analyzer-racing-coach-announced/ (Year: 2020).*

"How to enable/disable the driving line!" Published Nov. 16, 2021. Source: https://www.youtube.com/watch?v=UZ7-WPZkApc (Year: 2021).*

"Track Titan Become a Faster Simracer," published Oct. 26, 2020. Source: https://www.tracktitan.io (Year: 2020).*

"AI Simracing Coaching is Here," published Mar. 11, 2021. Source: https://www.youtube.com/watch?v=8IIRQJT4WM0 (Year: 2021).*

"Your all in one app for getting to top performance," published Dec. 4, 2021. Source: https://www.trophi.ai (Year: 2021).*

"Which AI method is used in advanced racing games?" published Jul. 19, 2018. Source: https://forum.unity.com/threads/which-ai-method-is-used-in-advanced-racing-games.541281/ (Year: 2018).*

Florian Fuchs et al: "Super-Human Performance in Gran Turismo Sport Using Deep Reinforcement Learning", arxiv.org, Cornell University Library, 201OLIN Library Cornell University Ithaca, NY 14853, May 9, 2021 (May 9, 2021), XP081950435.

Song Yunlong et al: "Autonomous Overtaking in Gran Turismo Sport Using Curriculum Reinforcement Learning", May 9, 2021 (May 9, 2021), XP055970543.

Ahmed Hussein et al, Imitation Learning: A Survey of Learning Methods, ACM Computing Surveys, ACM, New York ,NY, US ,US vol. 50 , No. 2, Apr. 6, 2017, 35 pages, XP058666261, ISSN : 0360-0300, DOI: 10.1145/3054912, p. 11,12,19.

Chan, et al., Development of a Car Racing Simulator Game Using Artificial Intelligence Techniques, Nov. 16, 2015, pp. 1-6, Hindawi Publishing Corporation.

Guckiran, et al., "Autonomous Car Racing in Simulation Environment Using Deep Reinforcement Learning", IEEE (2020), 6 pages.

* cited by examiner

ARTIFICIAL INTELLIGENCE FOR DRIVING LINES IN RACING GAMES

BACKGROUND OF THE INVENTION

1. Field of the Invention

Embodiments of the invention relates generally training artificial intelligent agents. More particularly, the invention relates to methods and systems for providing dynamic driving lines and other driver aides in a racing video game.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, racing video game provide players with one or more driving aides. For example, one ideal driving line can be provided for each class of cars. This driving line is established by an expert driver who works for the company and tries to drive the perfect, representative line for that car class. Furthermore, other driving aides can be displayed on the track to provide drivers with additional recommendations, such as where they should break, turn, and accelerate.

However, even within a class of cars, each car can differ enough so that the ideal driving lines and breaking points can vary.

Accordingly, there is a need for methods and systems for providing dynamic driving aids that can vary depending on various parameters.

SUMMARY OF THE INVENTION

Embodiments of the present invention provide a method for providing driving aides in a racing game comprising training a neural network for a trained agent to achieve optimal racing results in a particular car on a particular track; recording a trajectory of the trained agent on the track; converting the trajectory into course overlay information; and saving the course overlay information for the particular car and the particular track.

Embodiments of the present invention further provide a method for providing driving aides in a racing game comprising training a neural network for a trained agent to achieve optimal racing results in a particular car on a particular track; operating the trained agent in parallel with a player racing in the racing game, where the trained agent is provided state information of the player during the racing game; looking ahead, by the trained agent, to determine a recommended course of action based on the state information of the player, the recommended course of action determined by the trained agent to achieve the optimal racing result; and providing course overlay information based on the recommended course of action.

Embodiments of the present invention also provide a method for providing driving aides in a racing game comprising training a neural network for a trained agent to achieve optimal racing results in a plurality of particular cars on a plurality of particular tracks; recording a trajectory of the trained agent on each of the plurality of particular cars on the plurality of particular tracks; converting the trajectory into course overlay information; displaying the course overlay information on a player's display during racing by a player of the racing game using a selected one of the plurality of particular cars on a selected one of the plurality of particular tracks; and saving the course overlay information for the particular car and the particular track.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
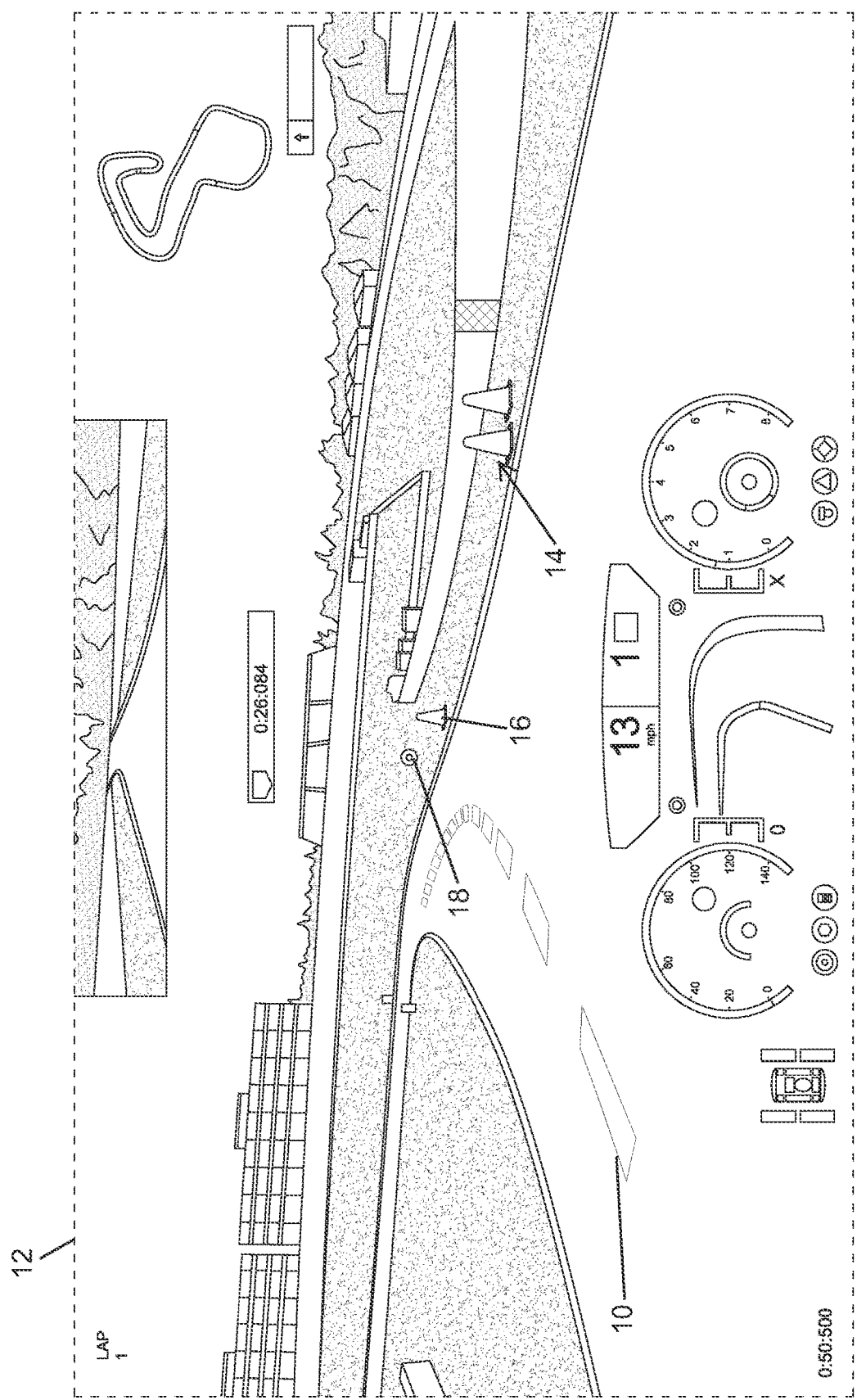
FIG. 1 illustrates a representative screen shot of a racing game having driving aides according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G, 5G and the like.

Embodiments of the present invention may include apparatuses for performing the operations disclosed herein. An apparatus may be specially constructed for the desired purposes, or it may comprise a general-purpose device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

The term "agent" or "intelligent agent" or "artificial agent" or "artificial intelligent agent" is meant to refer to any man-made entity that chooses actions in response to observations. "Agent" may refer without limitation to a robot, to a simulated robot, to a software agent or "bot", an adaptive agent, an internet or web bot.

Broadly, embodiments of the present invention provide dynamic driving aides for players participating in a racing game. These dynamic driving aides can include driving lines, turn indicators, braking indicators, steering targets and acceleration indicators, for example. As noted above, even within a class of cars, each car differs enough that the ideal driving lines and breaking points can vary. Therefore, with an agent trained via reinforcement learning, an ideal lines and other driving aides can be established for every individual car. These guides can even be varied to account for variations in the weather or other track conditions.

While the below description focuses on a racing game, it should be understood that aspects of the present invention can be applied beyond a car racing game. Embodiments of the present invention may be applied to cars, motorcycles, airplanes and other arial racing games, space racing, skiing, snowboarding, and the like.

Referring to FIG. 1, a driving line 10 is simply some overlay on the drivers view 12 of the track showing a recommended path. Often, it is a dotted yellow line, but other indicators are also available. In some embodiments, as shown in FIG. 1, a pair of cones 14 on the right can indicate where a player should start braking, and a single cone 16, shown farther up the road, can indicate where the player should start accelerating again. A floating circle 18 in the center of the screen indicates a target the player should aim their race car towards. In conventional racing games, these indicators are fixed for a track, regardless of the kind of car the player is driving. Essentially, these guides are, in conventional racing games, static information that is overlaid on the display of the track.

However, according to embodiments of the present invention, these driving aides may be static and may be configured for each type of car or even each individual car. Different cars have different traction, weight, braking ability, and the like. The actual line a player should follow can be a function of the friction limits of the car, its weight distribution, and other attributes. Thus, aspects of the present invention can provide driving aids that can vary with the type and/or attributes of the car.

Further, according to embodiments of the present invention, driving aides, such as the driving lines 10, can be provided that vary as a function of a player's current position and velocity. For example, the driving line 10 may automatically shift inward on the track if the player is moving slower than an ideal or maximum speed. An "ideal" speed may also be determined, according to aspects of the present invention, for each car or car type and/or each track. Such an ideal speed may be determined, for example, by reinforcement learning, through agent training in a given car on a given track. Also, a suggested braking point (as indicated by the pair of cones 14 in FIG. 1) can vary if the player is moving at a higher than ideal rate of speed on an outer portion of the track versus if the player was moving at a slower than ideal rate of speed or was in an inner portion of the track.

According to embodiments of the present invention, braking points can vary depending on one or more features. Such features can include the attributes of the car, current velocity, the type of tire being used and its current amount of wear, weight of onboard fuel, weather, track conditions or the like.

According to further embodiments, of the present invention, the targets to aim for, indicated by the floating circle 18 in FIG. 1) could be a function of the current position and velocity and may vary based on these or other attributes.

Figure 2:
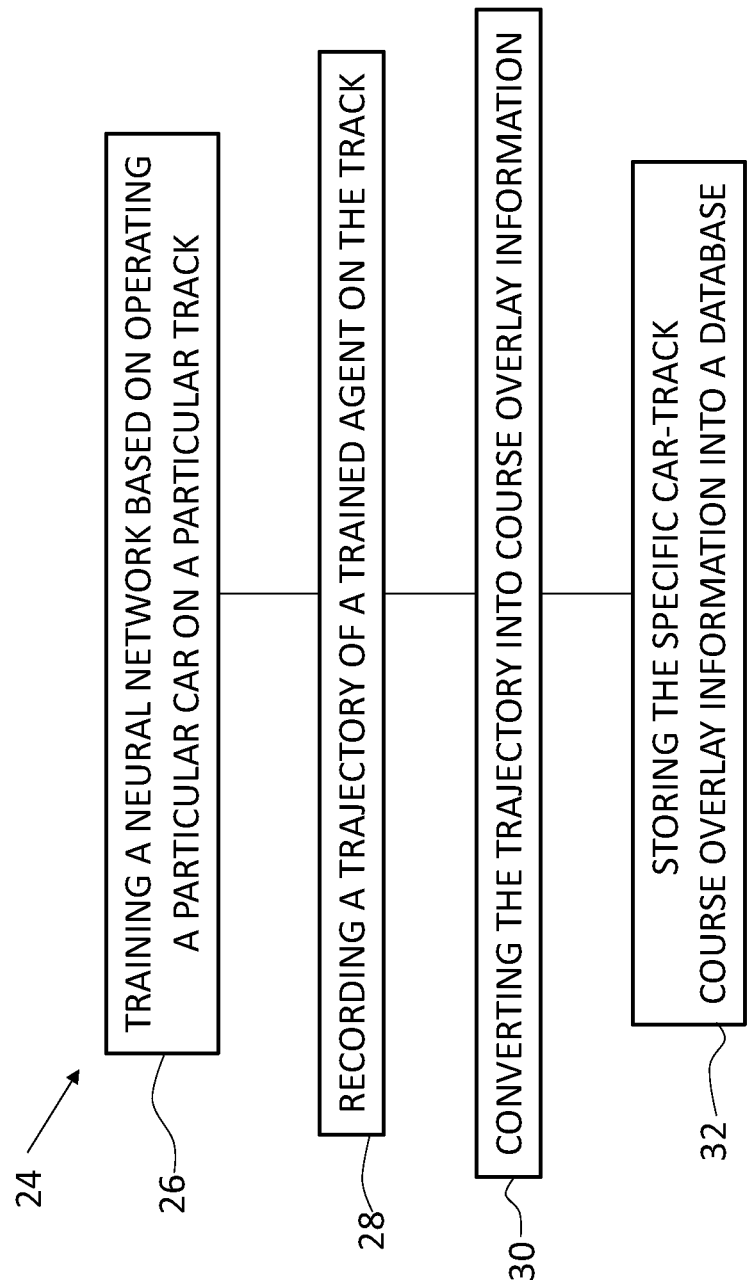
FIG. 2 illustrates an exemplary method according to an exemplary embodiment of the present invention.

Dynamic driving aides can be built into the game using various techniques. For example, referring to FIG. 2, a method 24 for providing dynamic driving aides in a racing game can include an act 26 of training a neural network based on operating a particular car on a particular track. For example, reinforcement learning can be used to train an agent to achieve optimal racing results in a particular car on a particular track. Such optimal racing results may be the best course time to complete a race, for example. The method 24 can further include an act 28 of recording the trajectory of the trained agent on the track. The method 24 can further include an act 30 of converting the trajectory into course overlay information that can be optionally turned on in the player's display. Finally, the method 24 can include an act 32 of storing the car-track specific overlay information in a database. This information may be stored in the game itself, on a cloud computing device, or the like, so that the game can optionally load this information when the player prepares for a race. The course overlay information can include details such as driving lines, braking areas, acceleration areas, and/or aiming point, as discussed above.

While the above provides driving aides that can be provided based on car and/or track information, other factors can be included in the training of the neural network. For example, the neural network may be trained with different levels of tire tread wear so that this feature can be factored into how the driving aides may vary based on actual tread wear of the player's tires.

Further, the driving aides can be computed dynamically during game play by running a trained neural network in the game, in parallel to the user's actual driving. This trained neural network can look ahead a predetermined time (such as n seconds), compute what it would do under the current player's driving state, and provide driving aides based on this determination. Thus, not only can the driving aides be provided based on the car specifics and/or track conditions, but the driving aides may be further refined by the actual state of the player's car at any given time. As discussed above, if the driver has a velocity that is slower than an ideal velocity (from which the initial car-track-based driving aides may be determined), the trained neural network, running in parallel with the game player, can determine what action would produce the best result for the player in their given state. Such information can be provided as a driving aide, such as an acceleration indicator or by altering the driving lines from those that may be computed before the race began. Thus, this feature may be used in conjunction with the initial computation of driving aides based solely on the car and/or track conditions, where the initial computation of the driving aides is modified based on the trained neural network running in parallel with the player's actual driving. In other embodiments, this feature may be solely used to provide the driving aides, in which case the original driving aides may not be used as a basis, but the driving aides may be provided solely based on the "live" use of the trained neural network to generate the driving aides during game play.

In some embodiments, the neural network may be trained not only for each car, track, weather condition, or the like, but also may be trained for certain traffic conditions. Thus, in some embodiments, the driving aides may change based on other player's cars being alongside or in front of the player. For example, driving lines can be provided to aide the player to navigate around other player's cars. Additionally, suggestions for when to accelerate or brake may also be provided to the driver. Such details may be provided dynamically, as discussed above, by a trained neural network operating in parallel with the players actual driving, providing the player with driving aides based on a look ahead to determine the course of action that the trained neural network would take to achieve the greatest reward.

Typically, the trained neural network can be trained to maximize a reward based on the best course time. In some embodiments, the reward function for the trained neural network may vary or may even be user-selected. For example, the reward function may be optimized to prevent collisions, where the driving lines may be adjusted to provide a greater space between the player's car and opponent cars. The trained neural network can be trained in various manners, such as that disclosed in U.S. provisional application No. 63/267,136, the contents of which are herein incorporated by reference.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

The invention claimed is:

1. A method for providing driving aides in a racing game comprising:
   training a neural network for a trained agent to achieve optimal racing results in a particular car on a particular track;
   operating the trained agent in parallel with a player racing in the racing game, where the trained agent is provided state information of the player during the racing game;
   looking ahead, by the trained agent, to determine a recommended course of action based on the state information of the player, the recommended course of action determined by the trained agent to achieve the optimal racing result; and
   providing course overlay information based on the recommended course of action.

2. The method of claim 1, further comprising displaying the course overlay information on a player's display during racing by the player of the racing game using the particular car on the particular track.

3. The method of claim 1, wherein method is repeated, changing the particular car or the particular track, to train the trained agent on each combination of possible cars and tracks in the racing game.

4. The method of claim 1, wherein the course overlay information is stored within the racing game.

5. The method of claim 1, wherein the course overlay information is stored in a cloud-based storage and is retrieved prior to starting a race in the racing game.

6. The method of claim 1, wherein the course overlay information is based on in-game weather conditions during the player racing in the racing game.

7. The method of claim 1, wherein the course overlay information is based additionally on a player's car velocity and current position in the racing game.

8. The method of claim 7, wherein the course overlay information is dynamically computed during the player racing in the racing game.

9. The method of claim 1, wherein the state information of the player includes at least one of a current a velocity of a race car of the player, a current trajectory of the race car of the player, attributes of the race car of the player and in-game weather conditions.

10. The method of claim 1, wherein the course overlay information includes at least one of driving lines, braking suggestions, acceleration information, and a trajectory target.

11. The method of claim 10, wherein the braking suggestions are provided as a function of attributes of the particular car.

12. The method of claim 10, wherein the braking suggestions are provided as a function of a velocity of the particular car during the racing game.

13. The method of claim 10, wherein the braking suggestions are provided as a function of a type of tire and an amount of wear of the tire.

14. The method of claim 10, wherein the trained neural network is trained to provide the trajectory target based on adjacent or upcoming traffic encountered by a player during the racing game.

15. The method of claim 1, wherein the trained neural network is trained to provide the recommended course of action based on adjacent or upcoming traffic encountered by the player during the racing game.

* * * * *